(12) United States Patent
Regan (10) Patent No.: US 7,927,103 B1
(45) Date of Patent: Apr. 19, 2011

(54) MATHEMATICS TEACHING KIT

(76) Inventor: Anne Regan, Huntsville, TX (US)

( * ) Notice: Subject to any disclaimer, the term of this patent is extended or adjusted under 35 U.S.C. 154(b) by 1177 days.

(21) Appl. No.: 11/585,290

(22) Filed: Oct. 23, 2006

(51) Int. Cl.
  *G09B 19/02* (2006.01)
(52) U.S. Cl. ................................................ 434/188
(58) Field of Classification Search .................... 434/81, 434/82, 96, 188, 191, 193, 195, 196, 209, 434/211, 216
  See application file for complete search history.

(56) References Cited

U.S. PATENT DOCUMENTS

| | | | |
|---|---|---|---|
| 342,651 A | 5/1886 | Southworth | |
| 1,174,689 A | 3/1916 | Coleman | |
| 1,649,578 A | 11/1927 | Deming | |
| 3,267,590 A * | 8/1966 | Browning | 273/272 |
| 3,414,986 A | 12/1968 | Stassen | |
| 3,664,788 A * | 5/1972 | Greenberg | 425/500 |
| 3,871,114 A | 3/1975 | Honig | |
| 4,090,311 A * | 5/1978 | Lyons | 434/184 |
| 4,373,917 A * | 2/1983 | Jackson | 434/209 |
| 4,496,510 A * | 1/1985 | Hanson et al. | 264/257 |
| 4,643,683 A | 2/1987 | Orsini | |
| 4,645,461 A | 2/1987 | Mortensen | |
| 4,988,321 A * | 1/1991 | Goldfarb | 446/75 |
| 4,993,932 A * | 2/1991 | D'Andrade | 425/154 |
| 4,998,883 A * | 3/1991 | Brinkley | 434/159 |
| 5,076,793 A | 12/1991 | Aghevli | |
| 5,238,407 A | 8/1993 | Pollock | |
| 5,338,203 A * | 8/1994 | Rheams | 434/208 |
| 5,427,528 A * | 6/1995 | Anderson et al. | 434/83 |
| 5,597,308 A | 1/1997 | Woldenberg et al. | |
| 5,620,324 A * | 4/1997 | Rettke | 434/160 |
| 5,679,002 A | 10/1997 | Scelzo | |
| 5,730,293 A * | 3/1998 | Kelly et al. | 206/575 |
| 5,865,627 A * | 2/1999 | Foresman | 434/193 |
| 5,868,577 A | 2/1999 | Aghevli | |
| 6,135,851 A * | 10/2000 | Drake et al. | 446/487 |
| 6,206,701 B1 | 3/2001 | Kohlberg | |
| 6,884,082 B1 * | 4/2005 | James | 434/408 |
| 7,458,813 B2 * | 12/2008 | Olsen et al. | 434/160 |
| 7,500,852 B2 * | 3/2009 | Wolf et al. | 434/188 |
| 7,645,139 B1 * | 1/2010 | Green et al. | 434/209 |
| 2003/0162153 A1 * | 8/2003 | Mohn et al. | 434/162 |

* cited by examiner

*Primary Examiner* — Kurt Fernstrom (74) *Attorney, Agent, or Firm* — Scott T. Griggs; Griggs Bergen LLP (57) ABSTRACT

A kit for teaching mathematics that will allow students to reason and understand basic mathematical principles. The kit uses moldable materials such as: dough, clay, and commercially available plastically moldable materials e.g. "Playdough®". The material is extruded to proper length and width befitting elementary youngsters. Cutters are used to fractionate the material. The fractions are used to solve elementary fractions, percentages, geometry, and algebra problems.

12 Claims, 5 Drawing Sheets

*Writing and Solving Percent Problems*[1]

In a percent equation such as 25% of 40 = 10. 25% is the percent, 40 is the base, and 10 is the percentage. How can you solve an equation if one of the parts is unknown? Explain how each equation is solved using basic properties.

1. 25% of 40 = x  ⟶  $\frac{1}{4} \cdot 40 = x$  ⟶  10 = x 2. 25% of x = 10  ⟶  $\frac{1}{4} \cdot x = 10$  ⟶  x = 40

3. x% of 40 = 10  ⟶  $\frac{x}{100} \cdot 40 = 10$ $x \cdot \frac{40}{100} = 10$

$x = 10 \cdot \frac{100}{40}$ $x = 25$

FIG. 2A

You can also visualize a percent bar and form a proportion.

1. The percentage is unknown.    25% of 40 = x $\frac{x}{25} = \frac{40}{100}$ $100 \left(\frac{x}{25}\right) = 100 \left(\frac{40}{100}\right)$ 4x = 40 x = 10

FIG. 2B

[1] This page is taken from the following textbook: Shultz, James E., Kathleen A. Hollowell, and Wade Ellis, Jr., HRW Alegebra. Dallas: Holt, Rinehart, and Winston, 1997.

MATHEMATICS TEACHING KIT

FIELD OF THE INVENTION

The present invention relates to the teaching of mathematics, and more particularly to a mathematics teaching kit that provides means for doing mathematical operations using moldable materials.

BACKGROUND OF THE INVENTION

The teaching of mathematics requires dedicated and talented teachers. The objective is to mold students in ways that will provide them with a good understanding of mathematics. A mathematics teacher must provide each student with the ability to reason and understand basic principles. The basic principles must be learned at an early stage, so the students can bring this knowledge forward to higher levels, and be successful in life. The tools and information that teachers bring into the classroom can greatly influence the results that they can achieve.

In developing the invention, insight was gathered from observations of teaching techniques used in $7^{th}$ grade math, and the tools that could be purchased in the open market.

In a typical $7^{th}$ grade class, math comprises the use of tools, such as: fraction bars, fraction circles, pattern blocks, cubes, and integer chips. These commercially available visuals can help students to understand fractions. There are limitations, however, with using these manipulative devices.

Desiring to add or subtract fractions utilizing these purchased visuals, one is limited by only enough pieces of each fractional size to make a whole. This restricts the types and number of problems one can teach. Construction paper is often used to cut the paper into shapes and sizes that assist in the teaching of mathematics. This technique, however, is very time consuming.

In addition, if a piece of any set of materials is lost, the set's usability is severely impaired.

These fractional visuals have an upper fraction limit of twelfths, and generally exclude sevenths.

Consider the problem $3/5+2/3$. What would a student use for the common denominator using the commercial visuals? There are no fifteenths in a commercial set to solve the problem. Also, having all the possible piece sizes available beforehand would impair the reasoning process. This is so, because too many different sized pieces in each fraction could add confusion, and turn the finding of the common denominator into a trial and error process. Trial and error is only appropriate at early stages of the mathematics learning process. It is much more appropriate to let the process evolve to an understanding of the underlying essence of the operation of fractions.

Using fraction bars, and fraction circles to find a common denominator is limited, because only part of the fraction is presented.

Some kits that are currently commercially available have a whole cut into a form upon which you can lay the fractional part. One is able to observe the part of the whole that is not filled. However, one does not visualize the size of the pieces that are missing to make the whole. That is to say, the space is empty of any visual realization. A student may possibly grasp the problem, when the student trades the pieces for a smaller size. It is realized that one can substitute two little pieces for a larger piece. However, the student does not realize that the same thing is actually happening to the pieces that are missing. In other words, this commercial kit or system fails to provide the necessary reasoning needed to solve the problem.

Working with fractions, requires the ability to reason how to arrive at a size for the least common denominator that will accommodate both fraction parts. Teaching students how to reason is the proper way to teach mathematics.

In developing the present invention, it was realized that moldable materials provided a means by which fractions and other mathematical problems could be taught. Moldable materials seemed to solve all of the aforementioned concerns.

Some inspection of the commercially available moldable dough enabled students to use reasoning to determine the size for a common denominator. Students did not need to experiment. Students gained a lot of understanding using the dough. Many students developed positive associative reasoning using the dough. These positive feelings transferred to other mathematical problems. In other words, it was realized that moldable materials were the proper teaching vehicles to develop mathematical reasoning.

However, it was also realized that molding and manipulating dough or clay in classrooms had some serious disadvantages, viz., molding and manipulating the dough to the proper shapes and sizes was time consuming. This left preciously little time for teaching the overall mathematical process. The inventor tried to find a way to quickly size and shape the dough or clay.

It was determined that an extruder was needed for obtaining the proper size and shape of the moldable materials. Some commercial children's dough kits are utilized only as playing tools, and contain a bucket of moldable dough. The bucket comprises a rolling pin, and some shape cutters for making geometric and animal shapes. Also, the system comes with an extruder with three sliders having different shapes for extruding the dough. All the openings (die orifices) of the extruder slider were under five eights of an inch. The extruder could be adapted to make rectangles of ½ inch. One half inch, however, is not wide enough to accommodate students ranging over a variety of levels of motor skills, coordination, and dexterity. Rectangle-shaped cutters were not provided.

A master patternmaker was hired by this inventor to modify this commercial extruder, and make a new slider, in order to produce a slot (die orifice) capable of making a rectangle one and one half inches wide. Using this modified extruder and the new slider, this inventor was able to produce a rectangular prism that was six and three quarter inches long, one and one half inches wide, and about one-quarter to three-sixteenths thin. This rectangular solid was produced in just a few seconds using super soft children's dough.

The present invention comprises a kit for making parts for math processes. The kit includes a container for housing moldable material, such as: dough or clay. The kit also comprises an extruder, and extruder attachments, for varying the shape and/or size of the extruding die orifice to fit mathematical needs. Other cutting or shaping accessories can be included, along with a work mat. Forms can be included showing the "whole" in which the fraction can be deposited. The forms can be printed upon the work mat. This is a powerful advantage, because it assists students to visualize the abstract written steps, while performing mechanical steps with the dough. The mat surface should allow for magic marker and erasable writing.

A guide, or instruction booklet is also enclosed in order to assist the teacher in the use of the materials for teaching mathematical processes. A CD, DVD, or media disk is included to visually instruct both teacher and student. Support materials and instructions can also be provided via a web site. A workbook can be enclosed as part of the accessories. A mold or a grid can also be part of the kit.

The advantage of this invention over other systems disclosed in the art is its versatility and ease of use. Using moldable material, one can quickly extrude the desired common denominator pieces, and also the pieces that are missing from both the top number of your fraction. In cutting all the pieces to make a whole, and finding a common denominator, one is also cutting the pieces one has as well as the pieces that are missing. (That explains why you multiply both the top number of the fraction (the number of pieces you have) and the bottom number (the number of pieces it takes to make a whole—the total of the pieces one has and the missing pieces) by the same number—no matter how many times one cuts each piece.

Many teachers who use fraction bars or fraction circles for teaching addition and subtraction, switch to a drawn model to show multiplication and division. This is so, because they can show additional cuts in their fractions representing multiplication and division.

Multiplication and division are easy to show with fraction rectangles made of moldable material. Moldable materials can be used to represent one fraction with vertical cuts, and then horizontal cuts can be made to represent the multiplication of that fraction by another fraction. There is no need to change models. Students can see what happens directly, when division is performed. In division, moldable material can represent both fractions separately, and then cuts can be placed where necessary to show how many times one fraction fits evenly into another. This works fine even if the answer is less than one.

It should be understood, that the invention is not limited to teaching multiplication and division within fraction problems. This inventive kit can also teach percentages, algebra, geometry, and percentage problems.

It is clear that all four operations with fractions can be comfortably accomplished with moldable materials. This can give students a greatly increased capacity for numbers, operations, and quantitative reasoning. This is so, because using the same model consistently reinforces the connections they make between operations done with the model, and helps them identify similarities and differences between these operations. The preferred model shape is a rectangle, but other shapes such as circles can be used.

The important goal in teaching is not to show children how to get answers by repetitive techniques. Rather, the true goal seeks to provide students with an understanding of exactly what is happening in the physical operations that are performed. The teacher wants these techniques to become comfortable in the student's psyche, as one would gather comfort from old friends. The teacher desires that the mystery so often associated with performing mathematical tasks be eliminated. It is also very important to connect steps on the written page with the steps of the process being physically preformed with the model. Using moldable material allows for the application of processes to be associated with the model. The invention provides a means of clearly showing what is happening in each step on the written work page. The processes made affordable by the invention not only provide a wonderful tool for student understanding, but the invention also provides concrete evidence for the teacher, whether the student has grasped and understood the mathematical process.

In summation, the kit of this invention is designed to expand the advantages of moldable materials in the teaching of mathematics. This expansion is directly linked to a device or method for quickly achieving the necessary shapes and sizes of the desired moldable materials. The use of an extruder fits neatly into the need for quickly obtaining the desired shapes and sizes, and for providing the necessary quantities of the materials sought. Hereinafter, the proper size of extrusions will be discussed. Although the invention features a simple mechanical extruder, it is contemplated that battery powered extrusion tools, such as motor-driven augurs feeding material through a chosen die, can also be part of this invention.

DISCUSSION OF RELATED ART

There are a variety of fixed-sized manipulatives that are illustrated in the related art. However, all of these manipulatives are, to the best of this inventor's knowledge and belief, comprised of rigid materials, such as illustrated in U.S. Pat. No. 342,651 issued to Southworth on May 25, 1886 for: MEANS FOR TEACHING FRACTIONS.

None of the prior art patents appear to provide moldable materials in their examples. Even if one could conclude that moldable materials would obviously present themselves as a means to teach mathematics, one would also have to admit that the commercially available moldable materials and their kits as presented in the market place are designed as play materials. There is a surprising lack of teaching or instruction concerning the effective use of moldable materials for mathematical purposes.

In U.S. Pat. No. 5,597,308; issued to: Woldenberg et al on Jan. 28, 1997, entitled: ASSEMBLY INCLUDING INTERLOCKING COMPONENTS FOR TEACHING MATHEMATICAL CONCEPTS, interlocking rigid components that combine to form different lengths of mathematical values, are illustrated. It is claimed that these rigid elements offer the advantage of being able to combine into a unitary whole. One is able to observe the various fractions needed to make a whole. They have a base for holding them. The patent states that they are an improvement over fraction bars and fraction tiles because they can be combined (interlocked) into a new unitary whole. The present invention is an improvement over these rigid fraction bars, because moldable materials can be sized to any fraction needed.

In U.S. Pat. No. 4,645,461; issued on Feb. 24, 1987, to Mortensen for: METHOD FOR STRUCTURALLY DIFFERENTIATING POLYNOMIAL FUNCTIONS, another method of illustrating variables, is shown.

In U.S. Pat. No. 1,174,689; issued on Mar. 7, 1916, to Coleman, for: APPLIANCE FOR TEACHING ARITHMETICAL FRACTIONS, strips (rectangular in the drawings) are mounted on a frame with wires and divided into portions representative of the denominator the strip represents. In the drawings the unit strip is at the top; under it is the strip containing two halves; under that is the strip containing three thirds, etc. U.S. Pat. No. 1,649,578; issued to Deming on Nov. 15, 1927, for: EDUCATIONAL DEVICE, a board with grooves. Blocks representing halves, fourths, sixths, and so on, are to be placed in the grooves.

U.S. Pat. No. 5,679,002 issued to Scelzo on Oct. 21, 1997 for: FRACTIONAL-ARITHMETIC-TEACHING GAME AND METHOD FOR PLAYING, discloses an apparatus and a method for playing a math board game which enables a student to manipulate game pieces in order to gain an understanding of the concept of fractions and arithmetical operations. Tokens advance along a pyramid shaped board as student throw a die, draw a card with a math question. Using a ruler marked with fractional units up to 2 inches, and individual fraction units such as %2 or 113 are placed along the ruler in determining the answer.

In U.S. Pat. No. 6,206,701 issued on Mar. 27, 2001 to Kohlberg for: MATHEMATICAL TEACHING APPARATUS AND METHOD, a mathematical teaching apparatus is illustrated which comprises block elements that fit inside a container. When dividing numbers, blocks are sorted into groups. Left over pieces are opened up to reveal 10 smaller blocks of equal size. These are sorted into groups. Remaining blocks are opened up to reveal still smaller blocks, which are then sorted into groups. This process continues until all the blocks are in a group, or the desired size of block in the remainder is reached. The application is written to include only next size 10 blocks within each block. It is not expanded to include any base, such as 5, in which there would be five next size blocks within each block. The blocks of the invention could be used for fractions, but it would be limited to tenths, hundredths, etc. and their equivalents. It would not be useful for determining solutions to problems having fractional answers involving thirds, fourths, or sixths, for example.

U.S. Pat. No. 4,643,683; issued to Orsini on Feb. 17, 1987, for: ECO SET DIDACTIC BLOCKS/CUBES illustrates a set of solids that can all be made by a plurality of sliders with geometric shapes. U.S. Pat. No. 342,651 discloses fraction circles stored in a container.

In U.S. Pat. No. 3,871,114 issued to Honig on Mar. 18, 1975, for: DEVICE FOR TEACHING THE ADDITION OF FRACTIONS, a device for teaching addition of fractions which includes various blocks such as ⅛, ⅜, ⅝, etc., is illustrated. U.S. Pat. No. 5,238,407 issued to Pollock on Aug. 24, 1993, for: BLOCKS WITH MATING BOSSES AND RECESSES WHICH BULGE FOR INTERFERENCE FIT, illustrates blocks with mating bosses and recesses with a bulge for connecting the blocks.

In U.S. Pat. No. 3,414,986; issued on Dec. 10, 1968 to Stassen, for: VISUAL TEACHING AID, attachable blocks are shown. Some of the blocks are cubes. Other blocks are prisms that have a length a multiple of a unit cube, and the other two dimensions are a unit. The length is marked off in units.

U.S. Pat. No. 5,076,793 issued on Dec. 31, 1991 to Aghevii for a FRACTAL MATHEMATICS KIT, illustrates a kit of fractal elements for learning mathematical concepts. The kit comprises at least one primary element having a first surface in the shape of an equilateral triangle. The surface of the element has ten attachment areas arranged in an equilateral triangular pattern, and non-attachment areas. The attachment areas are visibly different from the non-attachment areas. This kit can be used to represent numbers, perform operations, and demonstrate fractions, decimals, and percents, and other math processes. Owing to the fact that the kit is based on powers of ten, it is great for showing tenths, and hundredths, an also for showing halves and fifths, because they can be written with a denominator having a power of 10 and numerator which is a whole number. The kit would not be good for showing thirds, fourths, sixths, eighths or ninths, because they cannot be written with a denominator having a power of 10 and a numerator of a whole number.

In U.S. Pat. No. 5,868,577 issued on Feb. 9, 1999 to Aghevii, for: FACTOR BLOCKS KIT AND METHOD OF USE, a factor blocks kit is shown. The kit has a plurality of cubic, rectangular and triangular prisms and rectangular mats. The prisms are marked off in units. The kit can be used to compute greatest common factor, least common multiple, surface area and volume, in operating with fractions. This kit has rigid elements, which do not allow certain fractions to be demonstrated, because the blocks cannot be divided into the groups necessary to show a desired fractional part. The manipulatives are of fixed sizes.

SUMMARY OF THE INVENTION

In accordance with the present invention, a kit for teaching and learning mathematics is described. The kit comprises a container or bucket for housing moldable materials, at least one extruder (preferably two), extruder dies, and a work mat having imprinted forms for deposit of molded mathematical pieces. The moldable materials can be selected from a group of materials consisting of: dough, clay, Playdough®, and combinations thereof.

It is possible to have the work forms separate of the work mat, but integrating the forms with the work mat is more efficient. The mat should have a surface that accommodates the use of Magic Markers® and erasable writing tools. Cutting and shaping tools are also useful in the kit. Such tools can include plastic scissors and knives. A CD, DVD, or media disk is included for instructional purposes. A guide, or instruction booklet is also enclosed to assist the teacher in the use of the materials for teaching mathematical processes. The included CD or DVD visually instructs both teacher and student. Additional instructions can be obtained from a web site. A workbook can be enclosed as part of the accessories. A mold or a grid can also be part of the kit.

The kit is unique in that students will be able to develop their reasoning capabilities in solving mathematical problems by using the moldable materials. The shapes and sizes of the mathematical pieces necessary to solve fractions, algebra, and percentage problems are quickly obtained with the extruder and dies. The molded pieces allow the students to easily visualize the necessary pieces to make a whole, or to solve an equation. The extruder plays a vital part in improving the ability to quickly and uniformly size the moldable materials to widths in excess of one-half inch, and lengths approaching many inches. These larger sized materials fit neatly into the imprinted forms, and are easily handled by young students. Fitting the pieces within the forms allows the students to visualize and become cognizant of the mathematical relationship of the fractional pieces with respect to the whole. The larger pieces also assist in fabricating cylinders, prisms, and algebra tiles.

The method of using the kit comprises the steps of:
a) sizing moldable materials to a given width compatible with a fractional program of analysis;
b) using the sized moldable material with a form to analyze a mathematical problem;
c) subdividing the material into equal parts of a whole; and
d) solving said mathematical problem.

The present invention has as one of its objectives to provide new mathematical tools for improving the reasoning and understanding of mathematical principles at a basic level.

Another object of this invention is to provide a kit that can provide tools to aid the students in reasoning and understanding basic mathematical principles.

It is yet another object of the invention to provide tools for expanding the teaching of mathematical processes in grade school.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, a kit is shown for the teaching of mathematics that will allow students to reason and understand basic mathematical principles. The kit uses moldable materials such as: dough, clay, and commercially available plastically moldable materials e.g. "Playdough®". The material is extruded to proper length and width. Cutters are used to fractionate the material. The fractions are used to solve elementary mathematical problems.

Figure 1:
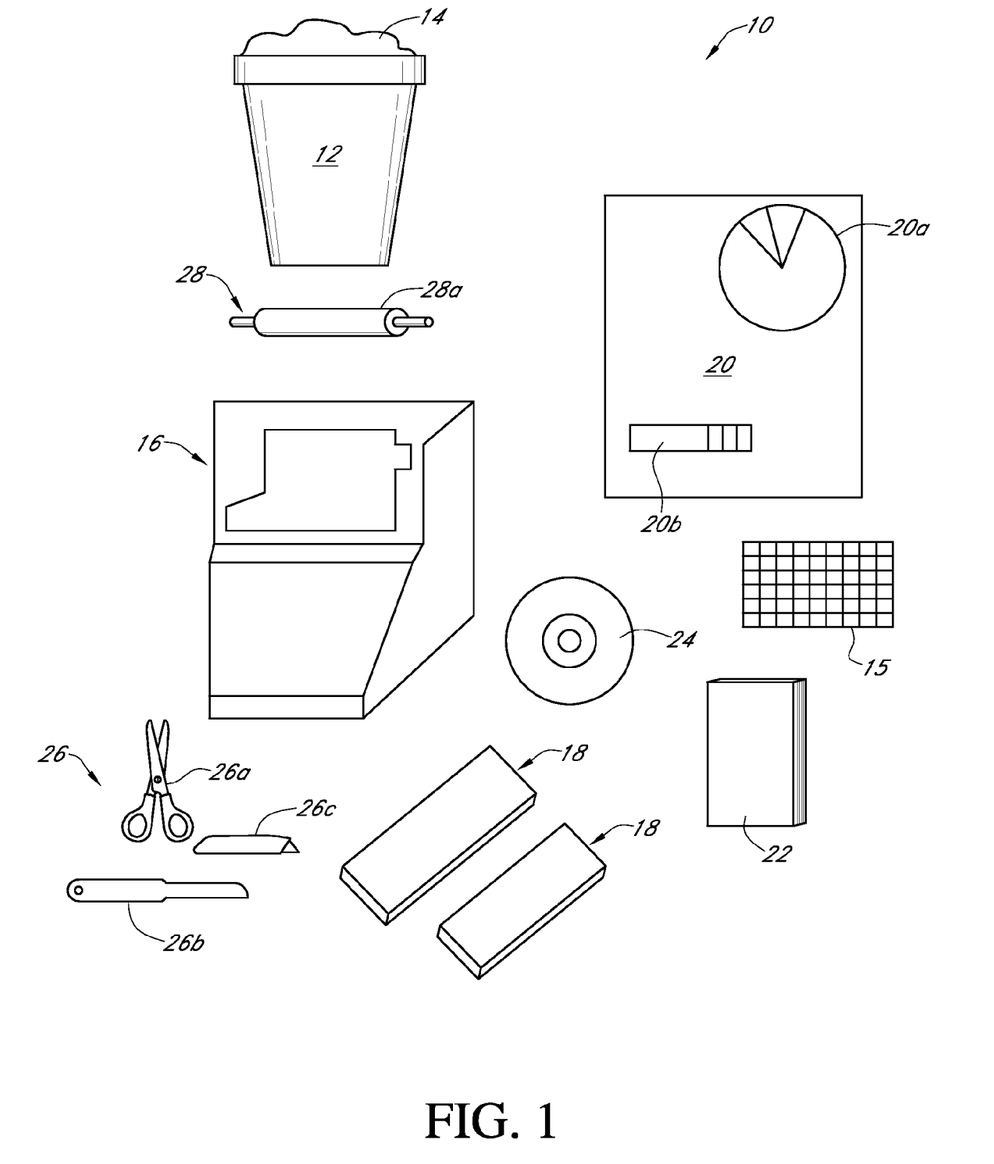
FIG. 1 illustrates a perspective, front view of the elements of the kit of this invention.

Now referring to FIG. 1, a kit 10 is shown for teaching mathematical principles, such as: fractions, percents, and basic algebra. The kit 10 is similar to kits found in the market place, such as the Crayola® kit and the Playdoh® kit. The kit of this invention is comprised of at least: a bucket 12, moldable material 14, an extruder 16, extruder dies 18, a work mat 20 with forms 20a imprinted thereupon, an instruction and work book 22, a CD, DVD, or media disk 24, for visually instructing teachers and students, cutters 26, such as: plastic scissors 26a, plastic knives 26b, and/or a plastic Exacto® tool 26c, etc., a flattening tool 28, such as a rolling pin 28a, and a grid 15. All of the cutting tools have dull and rounded edges for safety. The rolling pin 28a is a superfluous item, since the extruder 16 provides the necessary flatness to the formed products. The fact that the extruder provides a flat, uniform piece of material very quickly does away with the need for a rolling pin 28a.

The extruder dies 18 generally have a wider width than those found commercially in order to fabricate moldable pieces that can be used by young students with poor motor coordination. Generally younger students in the lower grades also prefer extruded widths of larger size, e.g. one, and one-half inches. Also, larger widths allow for the fabrication of geometrical shapes, such as: prisms, cylinders, circles, etc.

The moldable material 14 is a visual manipulative, which enhances the ability of a student to grasp and understand the mathematical percentages and fractions that are being written upon the note pads, black boards, and workbooks.

The moldable material can be selected from moldable materials, such as: dough, clay, Playdoh®, etc. All or most of the other components can be made of plastics, chosen as styrene, neoprene, polypropylene, etc., according to the characteristics needed, e.g. a knife cutter 26b could be made from styrene, to provide a ridged, fairly safe cutting edge, whereas a work mat 20 can be fabricated from neoprene.

Figure 2:
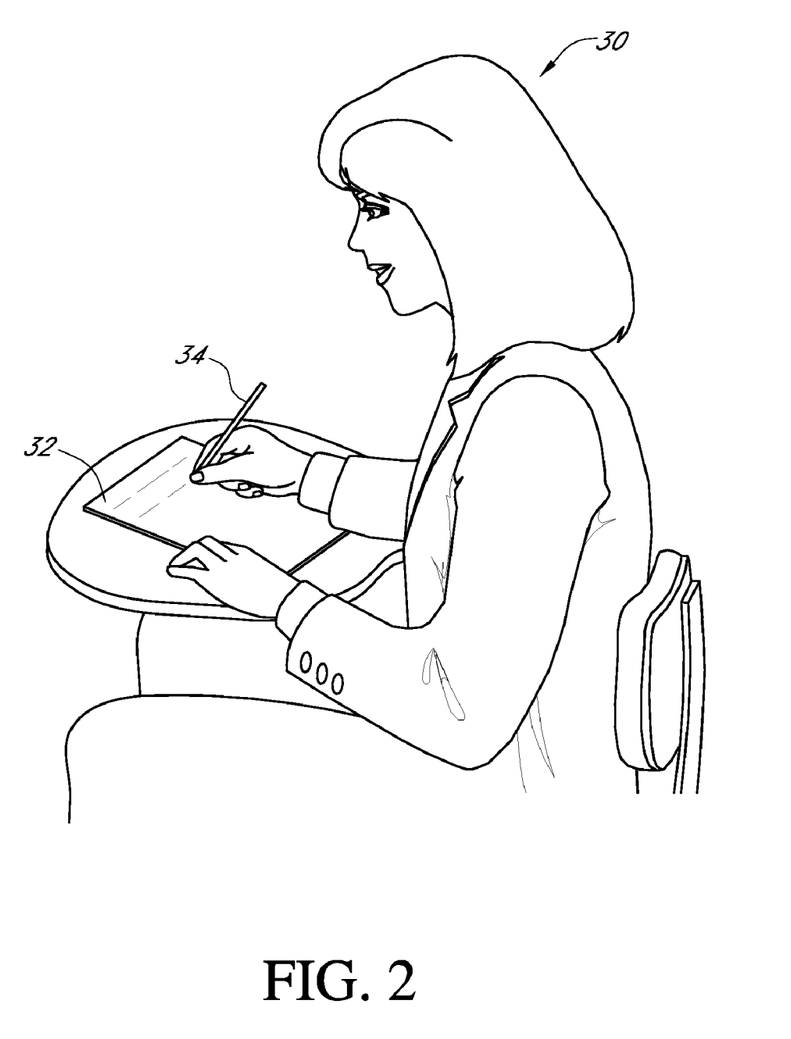
FIG. 2 depicts an in situ view of a person solving a percentage equation.
Figure 2A:
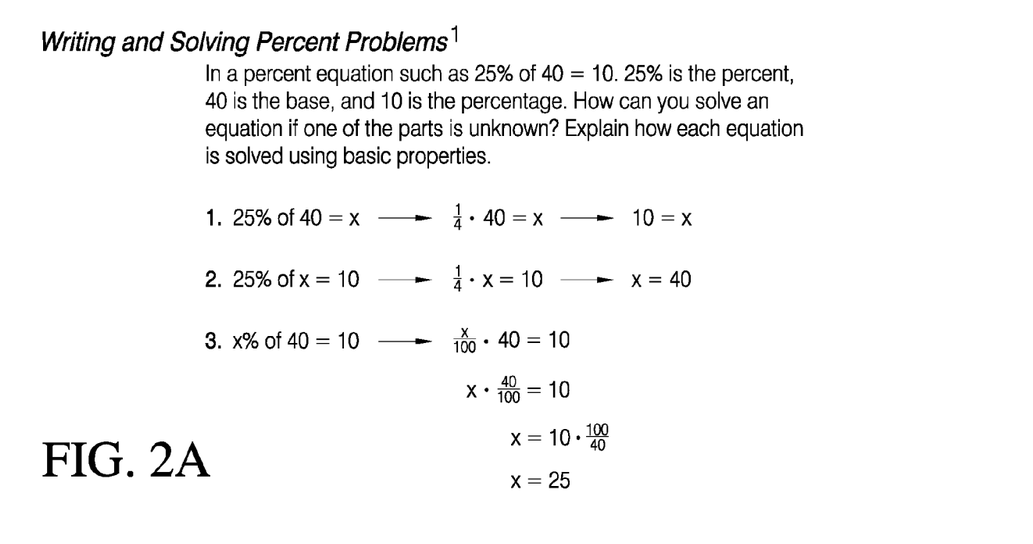
FIG. 2A illustrates an enlarged view the notepad portion being used by the person solving the percentage equation of FIG. 2.
Figure 2B:
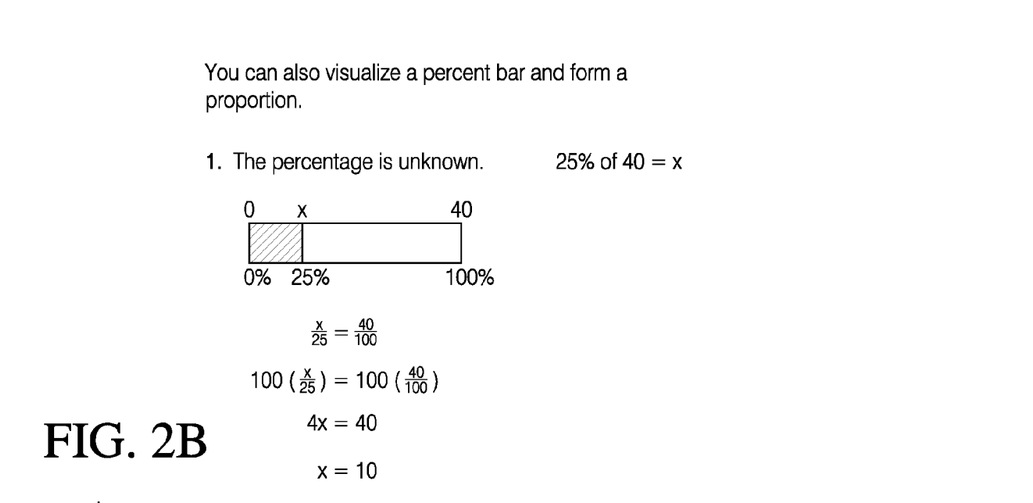
FIG. 2B depicts a method using the kit of FIG. 1 to solve the problem shown in FIG. 2A.

Referring to FIGS. 2, 2A, and 2b, a mathematical process needed to solve a simple percentage and fraction problem, is illustrated. In order to fully appreciate the enhanced understanding that the kit 10 and its moldable materials provide in solving the same problem, please observe the individual 30, shown in FIG. 2. The individual 30 proceeds to solve a simple percentage, and fractional problem utilizing a notepad 32, and pencil 34. The equations that this young lady is writing upon her notepad 32 are shown enlarged in FIG. 2a, to underscore the complexities required for solution. However, if a student used extruder 16 of FIG. 1 to form a length of moldable material forty inches long, as shown in FIG. 2b, then it becomes easy to visualize that 25% of 40 inches (representing "x" in the equations of FIG. 2A) is 10 inches long.

Figure 3A:
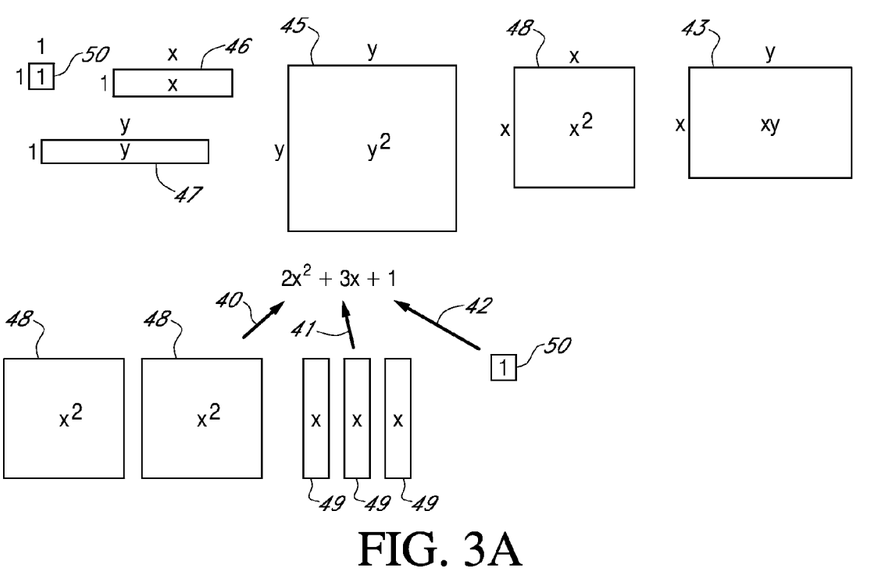
FIGS. 3A, 3B, and 3C respectively show a diagram view of a number of mathematical processes using moldable materials formed using the kit of FIG. 1. The moldable materials are shown being cut into fractional parts, in order to solve algebra and fraction problems.
Figure 3B:
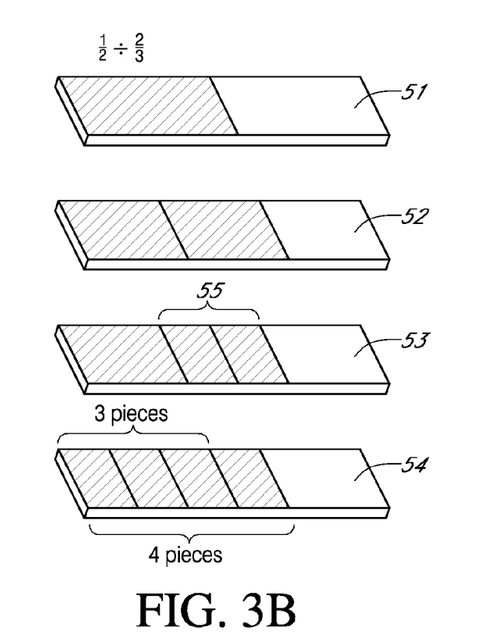
Figure 3C:
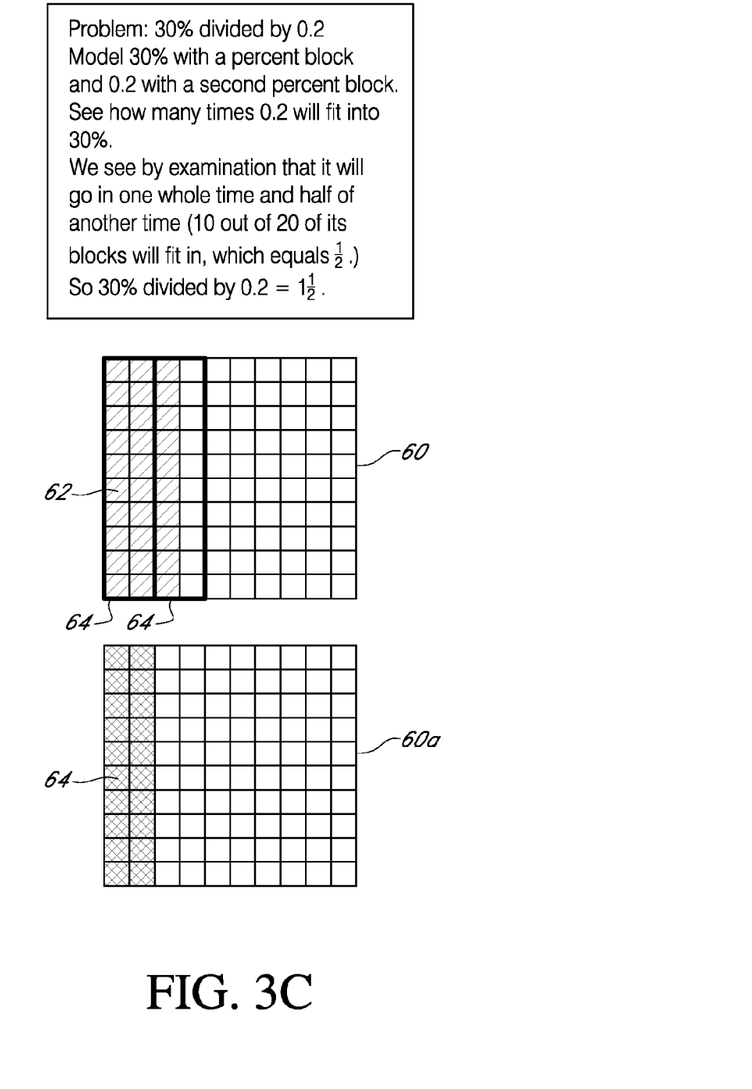

Referring to FIGS. 3A, 3B, and 3C, a number of mathematical processes are shown using the moldable, extruded materials of kit 10 of FIG. 1. In FIG. 3A, an algebraic expression: $2x^2+3x+1$, is shown represented by moldable pieces formed from the kit 10 of FIG. 1. Arrow 40 depicts how two respective moldable blocks 48, represent the segment: $2x^2$ in the expression. Arrow 41 illustrates how the three respective moldable blocks 49 represent the segment 3x of the expression, and arrow 42 represents how moldable block 50 represents the numeral one of the expression. Moldable pieces 45, 48, 46, 47, and 43, depict moldable pieces for the algebraic expressions: $y^2$, $x^2$, x, y, and xy respectively.

In FIG. 3B, a fraction problem "½÷", is expressed and solved by moldable pieces 51, 52, 53, and 54, respectively. Segment 51 represents a block that is divided into one-half (shaded portion). Segment 52 shows a similar block that is divided into two thirds (shaded portion). Segment 53 shows how the two-thirds segment 52 can be further sub-divided into a square 55 of two halves. Segment 54 shows how continuing to sub-divide the two-thirds segment 52 into half segments, shows that the solution to the problem is three pieces over four pieces, or "¾".

In FIG. 3C, the problem of taking 30% and dividing it by 0.2 can be represented by a grid segment 60 of ten equal parts, each represent 0.1. Moldable materials 18 of the kit 10 can be so fractionated using grid 15. We observe that 30% of this grid is shown by shaded portion 62 (three one-tenth pieces of the ten piece grid). Then, one can observe that a 0.2 portion can be represented on a grid 60a by a similarly shaded portion 64. Then over-lapping two 64 portions on top of grid 60 (shown in dark outline), we observe that the answer to the problem is one and one-half times (1½).

It should be evident that many problems of algebra, percent, and fractions can be represented, and better understood by the moldable segments of kit 10.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired for protection by Letters Patent is presented in the subsequently appended claims.

What is claimed is:

1. A method of teaching and learning fractions, percentages and algebra, and solving problems associated therewith using moldable, extruded material, comprising the steps of:
   a) extruding said moldable material into segments, each of the segments having a length and width, the length and width defining variables and constants in a predetermined mathematical problem;
   b) laying the extruded segments upon a work surface as visual manipulatives;
   c) defining the predetermined mathematical problem with the placement of the extruded segments, the placement of the extruded segments in combination with the work surface defining operations; and
   d) solving the mathematical problem associated therewith.

2. The method of teaching and learning fractions, and solving a fractional problem using moldable materials in accordance with claim 1, further comprising the step of:
   d) cutting said moldable material into smaller pieces.

3. The method of teaching and learning fractions, and solving a fractional problem using moldable materials in accordance with claim 1, further comprising the step of:
d) placing a grid upon said moldable material.

4. The method of teaching and learning fractions, and solving an algebraic problem using moldable materials in accordance with claim 1, further comprising the step of:
d) extruding moldable material into algebraic segments.

5. The method of teaching and learning a percentage problem using moldable materials in accordance with claim 1, further comprising the step of:
d) extruding moldable material into segments representing percentage values.

6. The method of teaching and learning a fractions problem using moldable materials in accordance with claim 1, further comprising the steps of:
d) extruding moldable material into fractional segments; and
e) laying said fractional segments upon a work surface representing a whole value.

7. The method of teaching and learning percentages, and solving a mathematical problem using moldable materials in accordance with claim 1, further comprising the step of:
d) using a mat upon which to place said moldable materials.

8. The method of teaching, learning, and solving a fractional problem using moldable materials in accordance with claim 1, further comprising the step of:
d) using a form upon which to place extruded moldable materials representing fractional segments, said form representing a whole value.

9. The method of teaching, learning, and solving a fractional problem using moldable materials in accordance with claim 8, further comprising the steps of:
e) determining a common denominator for said fractional problem.

10. The method of teaching, learning, and solving a fractional problem using moldable materials in accordance with claim 8, further comprising the steps of:
e) using a grid when said fractional problem is expressed as a percentage.

11. A method of teaching and learning fractions, percentages and algebra, and solving problems associated therewith using moldable, extruded material, comprising the steps of:
extruding the moldable material into segments having a given width;
for each of the extruded segments, sizing the extruded segments to a given length compatible with a mathematical program of analysis, each given length representing a real number;
laying the extruded segments upon a work surface as visual manipulatives, the work surface having a boundary that defines a whole value, each of the real numbers being less than the whole number;
placing the extruded segments within the boundary of the work surface to represent a predetermined mathematical problem; and
providing instruction relative to the relationship between the extruded segments and the whole value to induce the solving of the mathematical problem associated therewith.

12. A method of teaching and learning fractions, percentages and algebra, and solving problems associated therewith using moldable, extruded material, comprising the steps of:
extruding the moldable material into segments having a given width;
sizing each of the extruded segments to a given width and length compatible with a mathematical program of analysis, each given width and length of the extruded segments defines an exponential order for variables and constants in a polynomial expression, wherein a number of identical extruded segments defines a coefficient in the polynomial expression;
placing the extruded segments on the work surface, the placement of the extruded segments in combination with the work surface defining operations of the polynomial expression; and
providing instruction relative to the relationship between the extruded segments and the work surface to induce the solving of the polynomial expression associated therewith.

\* \* \* \* \*